United States Patent
Ranganathan Sathyanarayana (10) Patent No.: US 12,259,722 B2
(45) Date of Patent: Mar. 25, 2025

(54) SYSTEM AND METHOD FOR PREDICTING FAILURE IN A POWER SYSTEM IN REAL-TIME

(71) Applicant: Bharadwaj Ranganathan Sathyanarayana, Karnataka (IN)

(72) Inventor: Bharadwaj Ranganathan Sathyanarayana, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 17/704,349

(22) Filed: Mar. 25, 2022

(65) Prior Publication Data

US 2022/0308573 A1 Sep. 29, 2022

(30) Foreign Application Priority Data

Mar. 29, 2021 (EP) ..................... 21165553

(51) Int. Cl.
*G05B 23/02* (2006.01)
*G06N 20/00* (2019.01)
*G06Q 50/06* (2024.01)

(52) U.S. Cl.
CPC ......... *G05B 23/0283* (2013.01); *G06N 20/00* (2019.01); *G06Q 50/06* (2013.01)

(58) Field of Classification Search
CPC ..... G05B 23/0283; G06N 20/00; G06Q 50/06
USPC ........................................................ 700/286
See application file for complete search history.

(56) References Cited

U.S. PATENT DOCUMENTS

| | | | | |
|---|---|---|---|---|
| 5,625,751 | A * | 4/1997 | Brandwajn | H02J 3/24 706/907 |
| 2011/0282508 | A1 * | 11/2011 | Goutard | H02J 3/06 700/286 |
| 2012/0078436 | A1 | 3/2012 | Patel | |
| 2013/0218494 | A1 * | 8/2013 | Chiang | G01R 21/006 702/61 |
| 2013/0232094 | A1 * | 9/2013 | Anderson | G05B 23/0281 706/12 |
| 2018/0260561 | A1 * | 9/2018 | Mestha | G05B 23/0275 |
| 2020/0119556 | A1 | 4/2020 | Shi et al. | |
| 2020/0184308 | A1 | 6/2020 | Li et al. | |
| 2021/0014261 | A1 * | 1/2021 | Chiang | G05B 19/0426 |
| 2021/0294277 | A1 * | 9/2021 | Samaan | G05B 23/0283 |
| 2022/0057790 | A1 * | 2/2022 | Marinakis | G05B 23/0243 |

FOREIGN PATENT DOCUMENTS

EP 3422517 A1 1/2019

* cited by examiner

*Primary Examiner* — Md Azad
(74) *Attorney, Agent, or Firm* — Lempia Summerfield Katz LLC (57) ABSTRACT

A system and a method for predicting failure in a power system in real-time. The method comprises obtaining, by a processing unit, state estimation data corresponding to electrical quantities of the power system received from one or more sources in real-time, extracting a feature vector from the received state estimation data based on contingency analysis information using a trained machine learning model, wherein the feature vector corresponds to one or more parameters pertaining to the power system in real-time, determining a security index for the received state estimation data based on the extracted feature vector using the trained machine learning model and, predicting a failure of the power system based on the determined security index.

20 Claims, 8 Drawing Sheets

SYSTEM AND METHOD FOR PREDICTING FAILURE IN A POWER SYSTEM IN REAL-TIME

CROSS REFERENCE TO RELATED APPLICATIONS

This application claims the benefit of EP 21165553.5, filed on Mar. 29, 2021, which is hereby incorporated by reference in its entirety.

FIELD

Embodiments relate to power system failures and to a system and a method for predicting failure in a power system in real-time.

Power systems or utility service networks periodically experience fault occurrences such as outages of different types of power system equipment like generating units, transformers, AC transmission lines, breakers, shunt banks, busbar sections etc. The real-time assessment of operational security of the power system or the electricity grid has a huge impact in maintaining reliable service to end user and at optimal costs. The impact of large-scale system outages due to cascaded grid failures and blackouts are very severe and cost several million dollars or euros worth of losses to business and utilities, at a substantial cost to human quality of living.

Conventionally, for power grids and power systems, contingency analysis methods are commonly used to analyze contingencies affecting transmission and distribution elements (e.g., transmission lines, buses, breakers, transformers, etc.) and to determine how the power system network may be impacted by one or more contingencies relating to such elements. In current approaches, anticipated contingency situations and their impact on the bulk power system is assessed plainly through the security constraint violations and their severity. The operator is presented with statistical analyses through state estimation results and reports extracted from the contingency analyses and is expected to understand and interpret the security violations meaningfully, while considering historical behaviors and predicting impending situations. One of the problems associated with such a method is that the manual interpretation of such an analysis is confusing, time consuming and requires skilled operators for interpretation of contingency analysis results.

For example, if there is a loss of an AC transmission line due to unplanned outages, contingency simulation of the outage indicates the effects on the bulk power system due to the equipment outage. When similar contingency simulations for the same outage show different varied results over a period of time, the operator could interpret the nature of the real-time system security based on the trend of the contingency simulation outcomes. This is a manual effort, time consuming and depends on the operator's knowledge of archived contingency results over the period of time. In addition, when such analysis is performed for many different contingencies in real-time, the amount of information to be processed is exhaustive. Furthermore, another major problem associated with present approaches is that it is not obvious sometimes how the real-time power system transitions are trending towards, whether improving or worsening in terms of power system security and at what degree of change. Moreover, it may not be adequately determined what eventual security implications are for the power systems.

In light of the above, there is a need for a method for predicting failure in a power system in real-time, thereby intelligently assessing failures in a power system to prevent critical failures, cascaded outages, and large-scale blackouts in a cost-effective, less time-consuming, realistic, and consistent way.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a system and a method for predicting failure in a power system in real-time. The method includes obtaining, by a processing unit, state estimation data corresponding to electrical quantities of the power system received from one or more sources in real-time. The term "power system" refers a network of electrical components that are deployed to generate, transmit and transfer electrical energy to consumers and end-users. The power system may include several electrical components such as generators that supply power, transmission systems that carry power from generator to loads, and distribution systems that feed power directly to homes, buildings and industries. The electrical components may include generators, synchronizing equipment, circuit breakers, isolators, earthing switches, switch gears, busbars, power transformers, transmission lines, current transformers, potential transformers, relay and protection equipment, feeders, lightning arresters, station transformer, motors for driving auxiliaries in power station and so forth. The electrical quantities pertaining to the electrical components may include currents, voltages, active power, reactive power, branch flows, tap position, switch statuses and so forth. The term "state estimation data" refers to data corresponding to operating conditions of the power system at a given point in time that may be specified by a set of electrical quantities. In an embodiment, the state estimation data includes at least one of: a current state of the power system and current event information of the power system, regarding at least one of equipment outages, equipment faults, current power system equipment overloads, isolated networks affected, and bulk power systems affected, and topological information of the power system, local and global control settings in the power system.

The state estimation data may include steady state estimation data and transient state estimation data. The steady state estimation data refers to static data corresponding to operating conditions of the power system at a given point that may be specified by a set of bus voltage magnitudes and phase angles. The state of the power system at the given time is referred to as "steady state". The transient state estimation data refers to dynamic data corresponding to operating conditions of the power system at a given point that may be specified by a set of bus voltage magnitudes and phase angles obtained when the power system is in a quasi-steady state and is transitioning from one steady state of the power system to the other. The state of the power system at the given time is referred to as "transient state". Different states (operation conditions) of the power system may be defined owing to the overload of assets, over/under voltage in the system, transmission line outage, etc. The state estimation data is received from one or more sources such as state estimators that obtain data from data acquisition systems for example, supervisory control and data acquisition systems (SCADA). The SCADA systems may be communicatively coupled to field units that provide real-time measurements of electrical quantities to the state estimators at a given point in time. In an example, the field units may include real-time units (RTUs), intelligent electronic devices (IEDs) and phasor measurement units (PMUs).

The method includes extracting a feature vector from the received state estimation data based on contingency analysis information using a trained machine learning model. The feature vector corresponds to one or more parameters pertaining to the power system in real-time. The feature vector corresponds to a multi-dimensional vector that numerically represents the one or more parameters pertaining to the power system in real-time for the received state estimation data. In an embodiment, the method of extracting a feature vector from the received state estimation data of the power system includes determining one or more parameters pertaining to the power system from the received state estimation data using the machine learning model. Further, the method includes generating the feature vector including the determined one or more parameters.

The term "contingency analysis information" refers to contingencies of the power system that may be exposed to one or more possible occurrences (sometimes referred to as contingencies) to determine how such occurrences may impact the power system and/or one or more components of the power system. The contingency analysis information may be used to control or modify the power system in an attempt to avoid or minimize the impact of such undesirable outcomes on the power system. For example, in the context of power systems, contingency analysis information is commonly used to analyze contingencies affecting transmission elements (e.g., transmission lines, buses, breakers, transformers, etc.) and to determine how the network may be impacted by one or more contingencies relating to such elements. In an embodiment, the contingency analysis information includes at least one of: equipment information, transmission equipment information, distribution equipment information, isolated network information, overhead system information and power system outage information.

The method includes determining a security index for the received state estimation data based on the extracted feature vector using the trained machine learning model. The term "security index" refers to a probabilistic value of security of the power system. Furthermore, security index is a deterministic value that defines how secure the power system will be to unplanned outages and faults for a given period of time.

The method includes predicting a failure of the power system based on the determined security index. The term "failure" as used herein refers to a risk of breakdowns in the components of the power system. The failure of the power system may also be outages of the power system. The failure of the power systems may lead to blackout events due to breakdown of components. In an embodiment, the method further includes determining a severity of the predicted failure based on the determined security index.

According to an embodiment, the method further includes obtaining contingency analysis information for a plurality of states of the power system from at least one analyzer over a period of time. The contingency analysis information includes a plurality of contingency analysis paths pertaining to failure status of different components of the power system, and wherein each contingency analysis path includes cascaded state contingency information for each cascaded state. Further, the method includes determining auxiliary information pertaining to contingency analysis information for each cascaded state of the power system in the contingency analysis paths. The auxiliary information includes static system and equipment data model information, steady-state equipment information, topology and state variable information for each state of the power system. In an embodiment, the method further includes storing the obtained contingency analysis information for each state of the power system and corresponding auxiliary information in a contingency analysis database.

According to an embodiment, the method includes computing the security index for each contingency analysis path pertaining to state of the power system. Each of the cascaded state in a contingency analysis path has a common security index. Further, the method includes determining total load served at final cascaded state of the given contingency analysis path pertaining to the real-time state of the power system. The method includes determining total load served at the real-time state of the power system. The method includes computing the security index based on the determined total load served at the real-time state and cascaded states.

According to an embodiment, the method further includes training the machine learning model based on the contingency analysis database including a plurality of pairs of state of the power system and corresponding security indices.

According to an embodiment, the method further includes training the machine learning model based on the contingency analysis information including a plurality of pairs of state transitions of the power system and corresponding security indices.

In an embodiment, the method of determining the security index for the received estimation data based on the extracted feature vector using the trained machine learning model includes inputting the extracted feature vector at an input node of the trained machine learning model. The feature vector is a regressor variable for the machine learning model. The method includes outputting the predicted security index at an output node of the trained machine learning model. The security index is the target variable for the machine learning model.

According to an embodiment, the method includes outputting the failure of the power system on a graphical user interface associated with an output device.

Embodiments provide an apparatus for predicting failure in a power system in real-time. The apparatus including one or more processing units, and a memory unit communicatively coupled to the one or more processing units. The memory unit includes a failure prediction module stored in the form of machine-readable instructions executable by the one or more processing units, wherein the failure prediction module is configured to perform one or more aforementioned method steps Embodiments provide a system for predicting failure in a power system in real-time. The system includes one or more external sources capable of providing state estimation data associated with real-time condition of one or more power systems, a contingency analysis database including contingency analysis information of the one or more power systems and corresponding security indices, and a server communicatively coupled to the one or more sources. The server includes a failure prediction module is configured to perform one or more aforementioned method steps.

Embodiments provide a computer-program product having machine-readable instructions stored therein, that when executed by one or more processing units, cause the processing units to perform a method as described above.

BRIEF DESCRIPTION OF THE FIGURES

The above-mentioned attributes, features, and advantages and the manner of achieving them, will become more apparent and understandable (clear) with the following description of embodiments in conjunction with the corresponding drawings. The illustrated embodiments are intended to illustrate, but not limit the embodiments.

DETAILED DESCRIPTION

Hereinafter, embodiments are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1:
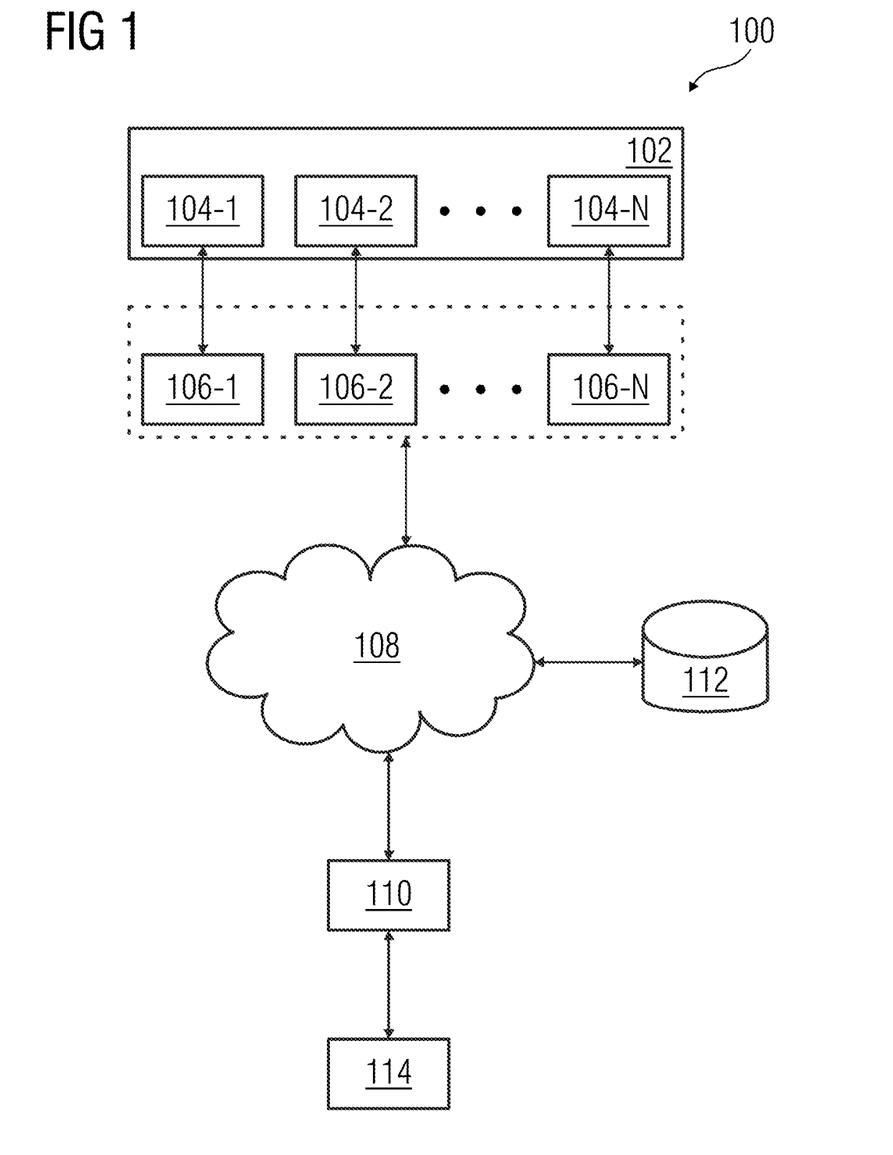
FIG. 1 depicts a system for predicting failures in a power system in real-time, in accordance with an embodiment.

Disclosed embodiments provide systems and methods for predicting failure in a power system in real-time. FIG. 1 depicts a system 100 for predicting failure in a power system 102 in real-time. The term "power system" 102 refers to a network of electrical components 104-1 to 104-N that are deployed to generate, transmit and transfer electrical energy to consumers and end-users. The power system 102 may include several electrical components 104-1 to 104-N such as generators that supply power, transmission systems that carry power from generator to loads, and distribution systems that feed power directly to homes, buildings and industries. The electrical components may include generators, synchronizing equipment, circuit breakers, isolators, earthing switches, switch gears, busbars, transformers, transmission lines, current transformers, potential transformers, relay and protection equipment, feeders, lightning arresters, station transformer, motors for driving auxiliaries in power station and so forth. The electrical quantities pertaining to the electrical components 104-1 to 104-N may include currents, voltages, active power, reactive power, branch flows and so forth. The system 100 includes one or more field units 106-1 to 106-N communicatively coupled to electrical components 104-1 to 104-N of the power system 102. The field units 106-1 to 106-N are configured to provide real-time measurements of electrical quantities to the state estimators at a given point in time. In an example, the field units 106-1 to 106-N may include real-time units (RTUs), intelligent electronic devices (IEDs) and phasor measurement units (PMUs).

Further, the system 100 includes an apparatus 110 communicatively coupled to the field units 106-1 to 106-N over a communication network 108. In some implementations, the apparatus 110 may be directly or indirectly coupled to communication network 108, such as communication network 108 hereinafter simply referred to as network 108. For example, the apparatus 110 may be directly coupled to network 108 via a hardwired network connection. Alternatively, the apparatus 110 may be wirelessly coupled to network via wireless communication channel established between the apparatus 110 and wireless access point (i.e., WAP) that in turn may be directly coupled to network. WAP may be, for example, an IEEE 802.11a, 802.11b, 802.11g, 802.11ac, 802.11ae, Wi-Fi®, RFID, and/or Bluetooth™ (including Bluetooth™ Low Energy) device that is capable of establishing wireless communication channel between user device and WAP. In other examples, the apparatus 110 may be wirelessly coupled to network via wireless communication channel established between the apparatus 110 and cellular network/bridge that may be directly coupled to network. User devices may execute an operating system, examples of which may include but are not limited to, Android®, Apple® iOS®, Mac® OS X®; Red Hat® Linux®, or a custom operating system.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

The apparatus 110 is configured to obtain state estimation data corresponding to electrical quantities of the power system 102 received from one or more sources in real-time. The apparatus 110 is configured to extract a feature vector from the received state estimation data based on contingency analysis information using a trained machine learning model. The feature vector corresponds to one or more parameters pertaining to the power system 102 in real-time. The apparatus 110 is configured to determine a security index for the received state estimation data based on the extracted feature vector using the trained machine learning model. The apparatus 110 is configured to predict a failure of the power system based on the determined security index. Such an apparatus 110 is explained in detail in FIG. 2.

Further, the system 100 includes a contingency analysis database 112 (sometimes referred to as database 112) for storing the contingency analysis information from one or more sources. The "contingency analysis database" 112 may be a database (e.g., relational database, object-oriented database, triple store database, etc.) for storing contingency analysis information and may be located within any suitable memory location, such as storage device coupled to processing unit. In some implementations, data, metadata, information, etc. described throughout the present disclosure may be stored in the database 112. The term database 112 as used herein refers to an organized body of digital information regardless of the manner in which the data or the organized body thereof is represented. The database is implemented using hardware, software, firmware and/or any combination thereof. For example, the organized body of related data is in a form of a table, a map, a grid, a packet, a datagram, a file, a document, a list or in any other form. The database includes any data storage software and systems, such as, for example, a relational database like IBM DB2 and Oracle 9. The database may be used interchangeably herein as database management system, as is common in the art. Furthermore, the database management system refers to the software program for creating and managing one or more databases. The database, when in operation, may support relational operations, regardless of whether it enforces strict adherence to the relational model, as understood by those of ordinary skill in the art. Additionally, the information is stored in the cells of the database.

It will be appreciated that the data pertaining to electrical quantities of the power system 102 is obtained from several field units 106-1 to 106-N and is provided to the state estimators for determining a state of the power system at a given point in time. The contingency analysis information is then determined from the data obtained from the field units 106-1 to 106-N. The contingency analysis information is determined for all cascaded states of the power system 102 that includes cumulative simulations of all violated electrical components along with a first electrical component. The first electrical component refers to the electrical component in the power system 102 accounted as the base electrical component in the cascaded electrical components of the power system. Such cascaded contingency analysis information is stored in the contingency analysis database 112. Each step of the cascading contingency calculation is preserved and archived as a "state" in the contingency analysis database 112. In an example, the artifact of each system state is exported as a full data model in common information model (CIM) format to the contingency analysis database 112. Each state of the power system 102 contains contingency analysis information along with auxiliary information that is stored in the contingency analysis database 112 in the CIM format. The term "auxiliary information" refers to additional information pertaining to the power system 102 that includes static system and equipment data model information, steady-state hypothesis, topology, and state variable information of the power system 102. Furthermore, security index corresponding to contingency analysis information of each of the states of the power system 102 is preserved in the contingency analysis database 112. Further, the system 100 includes a user device 114 for providing the predicted failure of the power system 100 in real-time. The user device 112 may include a graphical user interface for interfacing with the system 100, viewing results of failure of the power system 102.

Figure 2:
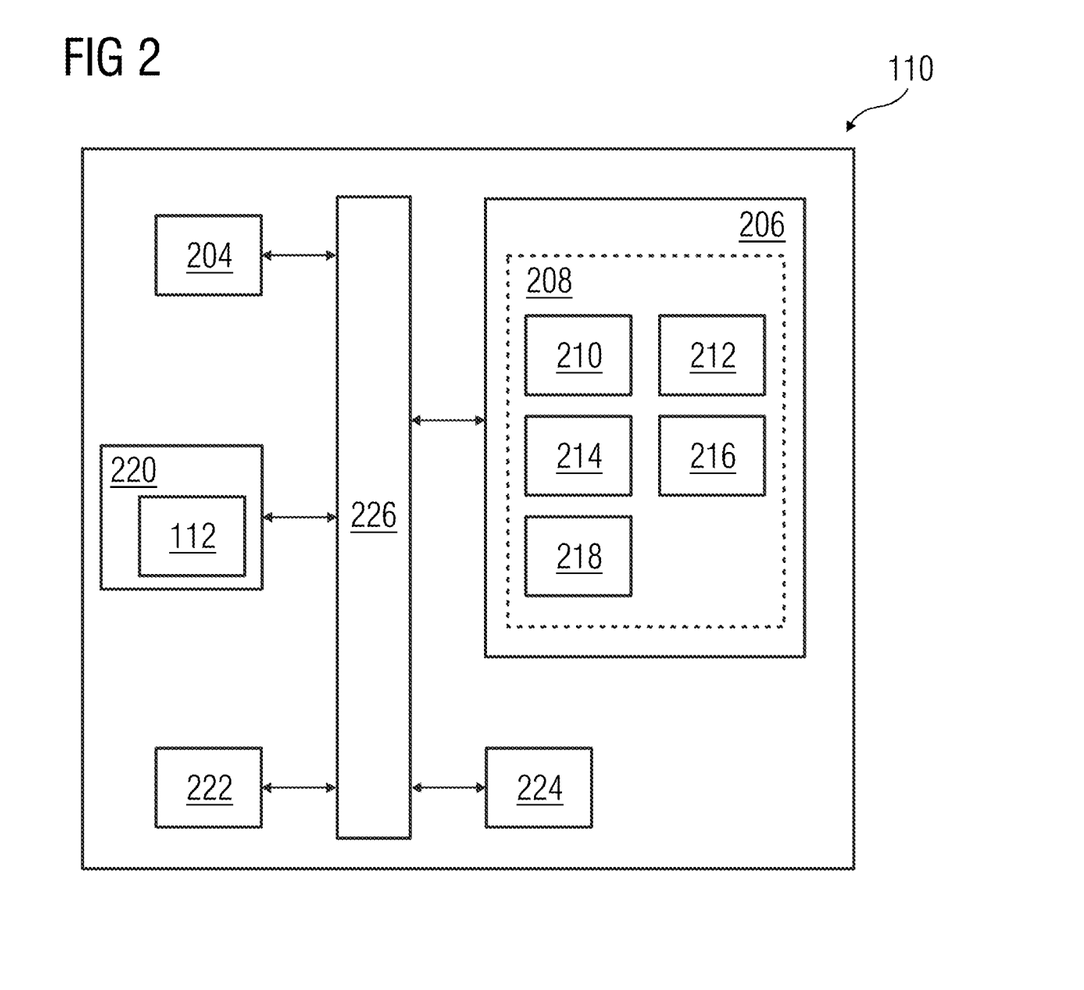
FIG. 2 depicts an apparatus predicting failures in a power system in real-time, in accordance with an embodiment.

FIG. 2 depicts an apparatus 110 for predicting failure in a power system 102 in real-time, in accordance with an embodiment. The apparatus 110 may be a computing device. In an example, the computing device may be a computer-program product programmed for performing the purpose. In another example, the computing device may be a computer readable medium on which program code sections of a computer program are saved, the program code sections being loadable into and/or executable in a system to make the system execute the steps for performing the purpose. The computing device may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device may be implemented in a single chip. In an embodiment, the apparatus 110 includes a includes one or more processing units 204, a memory unit 206, a contingency analysis database 112, storage unit 220, input unit 222 and output unit 224. Further, the apparatus 110 includes a communication mechanism such as a bus 226 for passing information among the components of the apparatus 110. The memory unit 206 may be communicatively coupled to the one or more processing units 204. For example, the processing unit 204 includes connectivity to the bus 226 to execute instructions and process information stored in the memory 206.

The processing unit 204 is configured for performing the method steps as aforementioned. The processing unit 204, as used herein, may refer to any type of computational circuit, including, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 204 may also include embedded controllers, such as generic or programmable logic devices or arrays, application specific integrated circuits, single-chip computers, and the like. In general, a processing unit 204 may include hardware elements and software elements. The processing unit 204 may be configured for multithreading, i.e., the processing unit 204 may host different calculation processes at the same time, executing them either in parallel or switching between active and passive calculation processes.

The memory unit 206 may include a volatile memory and a non-volatile memory. The memory unit 206 may be coupled for communication with the processing unit 204. The processing unit 204 may execute instructions and/or code stored in the memory unit 206. A variety of computer-readable storage media may be stored in and accessed from the memory unit 206. The memory unit 206 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

Figure 3:
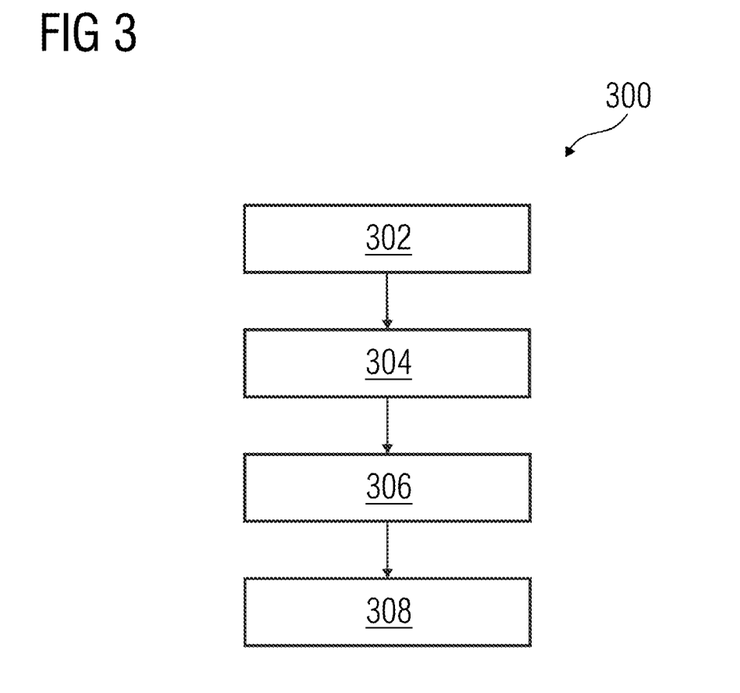
FIG. 3 depicts a flowchart of steps of a method for predicting failures in a power system in real-time, in accordance with an embodiment.

The memory unit 206 includes a failure prediction module 208 configured to perform the method steps as described in greater detail in FIG. 3. Further, the memory unit 206 includes a retrieval module 210, a feature extraction module 212, a security index computation module 214, a severity analysis module 216, a report generation module 218 henceforth collectively referred as the failure prediction module 208. The failure prediction module 208 is stored in the form of machine-readable instructions on any of the above-mentioned storage media and may be in communication to and executed by the one or more processing units 204. The following description explains functions of the modules when executed by the one or more processing units 204.

The retrieval module 210 is configured for obtaining state estimation data corresponding to electrical quantities of the power system 102. The state estimation data is received from one or more sources such as state estimators that obtain data from data acquisition systems for example, supervisory control and data acquisition systems (SCADA).

The feature extraction module 212 is configured for extracting a feature vector from the received state estimation data based on the contingency analysis information using the trained machine learning model. The feature vector corresponds to one or more parameters pertaining to the power system 102 in real-time. The machine learning model is trained on a plurality of contingency analysis information for different states of the power system and corresponding security indices.

The security index computation module 214 is configured for determining a security index for the received state estimation data based on the extracted feature vector using the trained machine learning model. The machine learning model is a regression model trained for accurately determining the security index for the received state estimation data based on extracted feature vector.

The severity analysis module 216 is configured for predicting a failure of the power system based on the determined security index. Further, the severity analysis module determines a severity of the predicted failure based on the security index.

The report generation module 218 is configured for generating a consolidated report including the failures of the components of the power system in real-time. The report generation generation module 216 may further be configured to highlight nodes, branches, and equipments that may be at risk based on the determined severity of the failure.

The storage unit 220 may be a non-transitory storage medium that stores the database 112. The database 112 stores cascaded contingency analysis information. Each step of the cascading contingency calculation is preserved and archived as a "state" in the contingency analysis database 112. In an example, the artifact of each system state is exported as a full data model in common information model (CIM) format to the contingency analysis database 112. Each state of the power system 102 contains contingency analysis information along with auxiliary information such as static system and equipment data model information, steady-state hypothesis, topology, and state variable information of the power system 102 that is stored in the contingency analysis database 112 in the CIM format. Furthermore, security index corresponding to contingency analysis information of each of the states of the power system 102 is preserved in the contingency analysis database 112.

The apparatus 110 may further include the input unit 222 and the output unit 224. The input unit 222 may include input devices such as keypad, touch-sensitive display, camera (such as a camera receiving gesture-based inputs), etc., capable of receiving input signals such as requests for providing failure reports, selecting particular components of the power system for severity analysis and the like. The output unit 224 may be a user device with a graphical user interface for displaying the generated reports on the risk of failure of the power system 102. The bus 226 acts as interconnect between the processing unit 204, the memory unit 206, the storage unit 220, the input unit 222, and the output unit 224.

Those of ordinary skilled in the art will appreciate that the hardware depicted in FIGS. 1 and 2 may vary for different implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter, network connectivity devices also may be used in addition or in place of the hardware depicted. The depicted example is provided for the purpose of explanation only and is not meant to imply architectural limitations with respect to certain embodiments.

A system in accordance with an embodiment includes an operating system employing a Graphical User Interface. The operating system permits multiple display windows to be presented in the Graphical User Interface simultaneously with each display window providing an interface to a different application or to a different instance of the same application. A cursor in the Graphical User Interface may be manipulated by a user through the pointing device. The position of the cursor may be changed and/or an event such as clicking a mouse button, generated to actuate a desired response.

One of various commercial operating systems, such as a version of Microsoft Windows™ may be employed if suitably modified. The operating system is modified or created in accordance with the present invention as described.

Embodiments are not limited to a particular computer system platform, processing unit, operating system, or network. One or more aspects may be distributed among one or more computer systems, for example, servers configured to provide one or more services to one or more client computers, or to perform a complete task in a distributed system. For example, one or more aspects may be performed on a client-server system that includes elements distributed among one or more server systems that perform multiple functions according to various embodiments. These elements include, for example, executable, intermediate, or interpreted code, that communicate over a network using a communication protocol. Embodiments are not limited to be executable on any particular system or group of systems, and is not limited to any particular distributed architecture, network, or communication protocol.

Referring to FIG. 3, in conjunction with FIGS. 1 and 2, a flowchart depicting steps of a method 300 for predicting failure in a power system 102 in real-time is described, in accordance with an embodiment. The method 300 includes steps 302 to 308 and may be implemented on the apparatus 110.

At step 302, the state estimation data corresponding to electrical quantities of the power system 102 is received from one or more sources in real-time. The state estimation data corresponds to operating conditions of the power system 102 at a given point in time that may be specified by a set of electrical quantities. The state estimation data is received from one or more sources such as state estimators that obtain data from data acquisition systems for example, supervisory control and data acquisition systems (SCADA). The SCADA systems may be communicatively coupled to field units 106-1 to 106-N that provide real-time measurements of electrical quantities to the state estimators at a given point in time. In an example, the field units 106-1 to 106-N may include real-time units (RTUs), intelligent electronic devices (IEDs) and phasor measurement units (PMUs).

In an embodiment, the state estimation data includes at least one of: a current state of the power system 102 and current event information of the power system 102, regarding at least one of equipment outages, equipment faults, current power system equipment overloads, isolated networks affected, and bulk power systems affected, and topological information of the power system 102, local and global control settings in the power system 102. The state estimation data may include steady state estimation data and transient state estimation data. The steady state estimation data refers to static data corresponding to operating conditions of the power system 102 at a given point that may be specified by a set of bus voltage magnitudes and phase angles obtained when the power system 102 is in a static state. The state of the power system 102 at the given time is referred to as "steady state". The transient state estimation data refers to dynamic data corresponding to operating conditions of the power system at a given point that may be specified by a set of bus voltage magnitudes and phase angles obtained when the power system is in a quasi-steady state and is transitioning from one steady state of the power system 102 to the other. The state of the power system at the given time is referred to as "transient state". Different states (operation conditions) of the power system 102 may be defined owing to the overload of assets, over/under voltage in the system, transmission line outage, etc.

In an embodiment, the state estimation data is received by the processing unit 204 from state estimators for a particular point in time. For example, the state estimation data for the given point in time is a snapshot of the power system 102 and is sometimes referred to as "system state" hereinafter. This includes any real-time system condition, and any system snapshots of contingency analysis and its cascaded calculations. The term "state transition" is used to refer the change of system state from one state to the next state. It denotes the sequential transition of the state from one condition to the next. In case of real-time transition, the transitions are affected by real-time system parameter changes including natural, planned, and unplanned system behaviors and their outcomes. For example, states may be of two types: real-time and cascaded. In case of the contingency system transitions, the transitions are affected by the cascaded nature of the simulated contingency calculation.

Figure 6A:
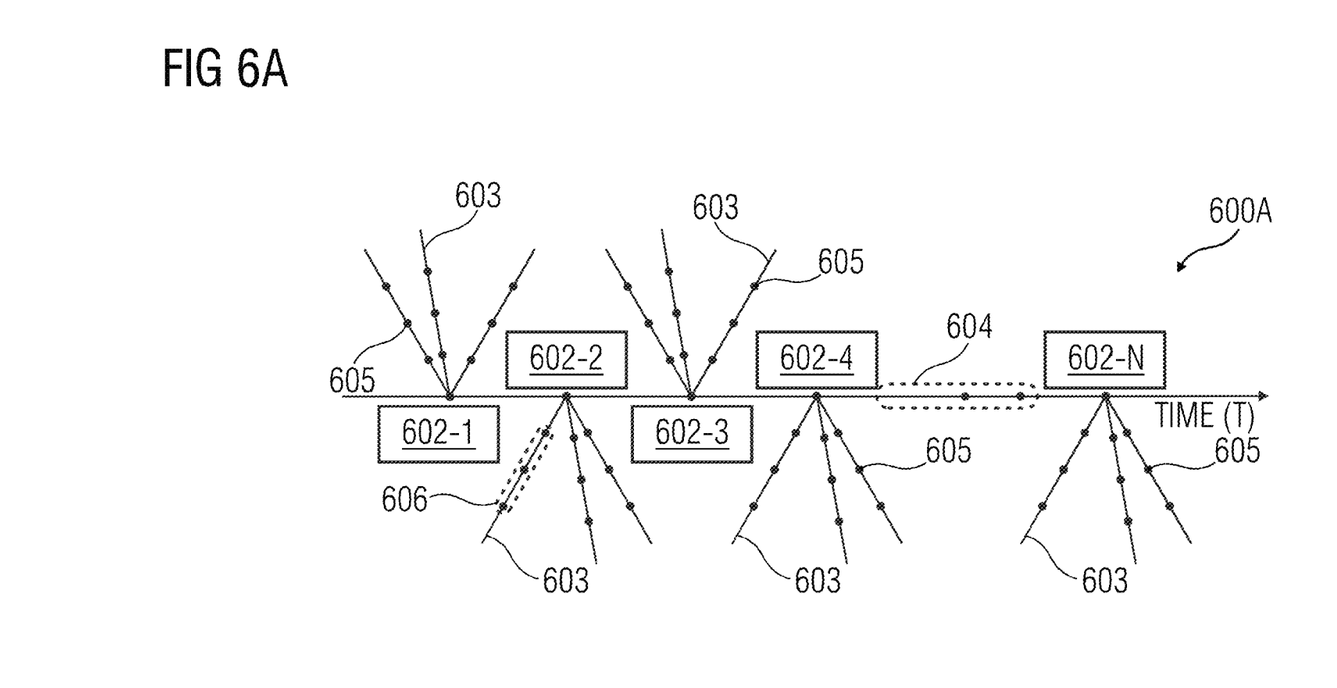
FIG. 6A depicts a graph representing real-time states and transition states of cascaded contingencies pertaining to the power system, in accordance with another embodiment.

Such real-time and cascaded states may be seen in FIG. 6A. FIG. 6A depicts a graph 600A representing real-time states and transition states of cascaded contingencies pertaining to the power system, in accordance with an embodiment. For example, the system states and transition states for real-time and cascaded scenarios are depicted with respect to time in a directed acyclic graph (DAG) 600A. Herein, 602-1, 602-2, 602-3, 602-4 and 602-N depict system states in real-time. In an example, 602-1 corresponds to state i, 602-2 corresponds to state i+1, 602-3 corresponds to state i+2, 602-4 corresponds to state i+3 and 602-N corresponds to state j. It will be appreciated that states 602-1, 602-2, 602-3, 602-4 and 602-N progress with respect to time. Further, for each state 602-1, 602-2, 602-3, 602-4 and 602-N there are shown N−1 contingency analysis paths depicted by 603. Each path of the directed acyclic graph 603 represents a contingency analysis path for a particular state 602-1, 602-2, 602-3, 602-4 and 602-N in real-time. 605 depicts cascaded system states in each of the N−1 contingency analysis paths 603. The real-time state transitions are depicted as 604 and cascaded state transitions in a contingency analysis path are depicted as 606.

At step 304, the feature vector is extracted from the received state estimation data based on contingency analysis information using the trained machine learning model. The contingency analysis information may include contingencies of the power system 102 that may be exposed to one or more possible occurrences (sometimes referred to as contingencies) to determine how such occurrences may impact the power system 102 and/or one or more components of the power system 102. The contingency analysis information may be used to control or modify the power system 102 in an attempt to avoid or minimize such undesirable outcomes. For example, in the context of power systems 102, contingency analysis information is commonly used to analyze contingencies affecting transmission and distribution elements (e.g., transmission lines, buses, breakers, transformers, etc.) and to determine how the network may be impacted by one or more contingencies relating to such elements. In an embodiment, the contingency analysis information includes at least one of: equipment information, distribution equipment information, isolated network information, overhead system information and power system outage information. The determination of contingency analysis information is explained in greater detail in FIG. 4.

In an embodiment, contingency analysis information is obtained for a plurality of states of the power system 102 from at least one analyzer over a period of time. In an example, the at least one analyzer determines contingencies using N−1 contingency analysis. The contingency analysis information includes a plurality of contingency analysis paths pertaining to failure status of each component of the power system 102. Each contingency analysis path includes cascaded state contingency information for each cascaded state. Further, auxiliary information pertaining to contingency analysis information is determined for each cascaded state of the power system 102. The auxiliary information includes static system and equipment data model information, steady-state equipment information, topology information and state variable information for each state of the power system 102. In an embodiment, the obtained contingency analysis information for each state of the power system 102 and corresponding auxiliary information is stored in the contingency analysis database 112. The security index for each contingency analysis path pertaining to the state of the power system 102 is computed. Each of the cascaded state in a contingency analysis path will have a common security index. It will be appreciated that the security index computed for a particular state in a given contingency analysis path is associated with each of the cascaded states in the given contingency analysis path. The method of computing security index is explained in greater detail in FIG. 7. Notably, the contingency analysis information and corresponding computed security indices for each state is stored in the contingency analysis database 112 for training the machine learning algorithm. The method of training the machine learning algorithm is explained in detail in FIG. 5.

For example, the feature vector corresponds to one or more parameters pertaining to the power system 102 in real-time. The feature vector corresponds the to one or more parameters pertaining to the power system 102 in real-time. The feature vector corresponds to a multi-dimensional vector that numerically represents the one or more parameters pertaining to the power system 102 in real-time for the received state estimation data. In an embodiment, the method of extracting a feature vector from the received state estimation data of the power system 102 includes determining one or more parameters pertaining to the power system 102 from the received state estimation data using the machine learning model. Further, the method includes generating the feature vector including the determined one or more parameters. It will be appreciated that the feature vectors are extracted from the contingency analysis information and corresponding computed security indices for each state stored in the contingency analysis database 112.

Examples of such parameters are illustrated in Table 1:

| Parameters | Nomenclature |
| --- | --- |
| Total actual served load, active (MW) and reactive (MVAR) | $P^{la}$ and $Q^{la}$ |
| Total system forecast load, active (MW) and reactive (MVAR) | $P^{lf}$ and $Q^{lf}$ |
| Network topology (represented through but not limited to a node incidence matrix) | T |
| Equipment calculated active (MW) and reactive (MVAR) power, including bus injections and branch flows (Represented though but not limited to an adjacency matrix with buses along the rows and equipment along the column of the matrix) | $P^{eq}$ and $Q^{eq}$ |
| Solved bus voltages magnitudes (kV) and angles (deg) | V and $\delta$ |
| Equipment thresholds (kV for buses; MVA/AMPS for branches and injections; angle difference thresholds; MVAR limits etc.) | $P^{lim}, Q^{lim}, I^{lim}, \delta^{lim}, S^{lim}$ |

Figure 6B:
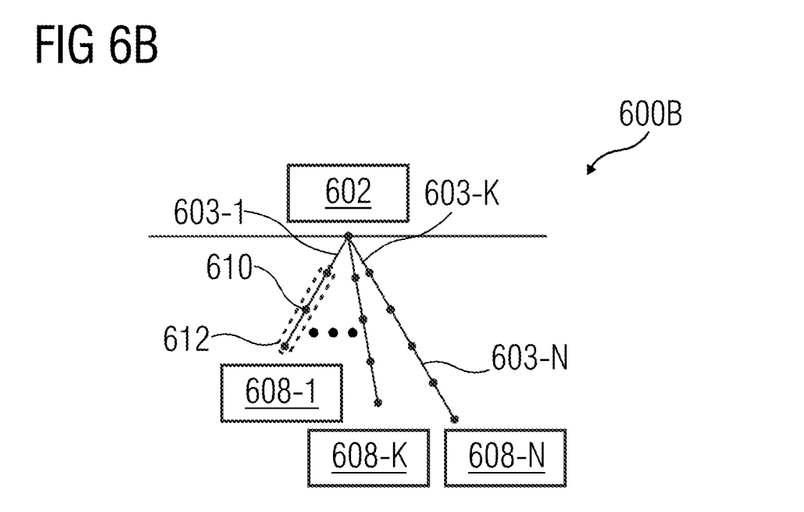
FIG. 6B depicts a graph representing feature vectors for real-time and cascaded states of the power system, in accordance with an embodiment.

For the parameters given in Table 1, the trained machine learning model is configured for generating feature vector as:

$X = \{P^{la}, Q^{la}, P^{lf}, Q^{lf}, P^{eq}, Q^{eq}, P^{lim}, Q^{lim}, I^{lim}, \delta^{lim}, S^{lim}, T, V, \delta\}$ $Y = \{U_i X_i\}$ Referring to FIG. 6B, illustrated is a graph 600B representing extracted feature vectors for real-time and cascaded states of the power system, in accordance with an embodiment. An example of a feature vector representation for state i depicted as 602 is shown. As shown, the contingency analysis paths are depicted as diagonal lines 603 having cascaded states 605. For example, 603-1 represents a first contingency analysis path, 603-k represents a $k^{th}$ contingency analysis path and 603-N represents an $N^{th}$ contingency analysis path. For a given real-time state i and cascaded contingency analysis path 603-1, state feature vectors $X_{i,1,j}$ corresponding to the $j^{th}$ cascaded state and state transition feature vectors $Y_{i,1}$ is represented as 610 and 612 respectively. It should be noted that the state feature vectors $X_{i,1,j}$ and state transition feature vectors $Y_{i,1}$ are alternate embodiments and are represented in the figure only for illustration purposes. It will be appreciated that either of the state feature vectors $X_{i,1,j}$ and state transition feature vectors $Y_{i,1}$ are extracted based on a defined methodology for prediction of failures of the power system 102.

Notably, the security index calculated for each cascaded state in a contingency analysis path 603-1, 603-k or 603-N will be same for all the cascaded states in a particular path. In an embodiment, a first security index $S_{i,1}$ represented by 608-1 computed for first contingency analysis path 603-1 is associated with each of the cascaded states in the first contingency analysis path 603-1. A second security index $S_{i,k}$ represented by 608-k computed for $k^{th}$ contingency analysis path 603-k is associated with each of the cascaded states in the $k^{th}$ contingency analysis path 603-k. A third security index $S_{i,N}$ represented by 608-N computed for $N^{th}$ contingency analysis path 603-N is associated with each of the cascaded states in the $N^{th}$ contingency analysis path 603-N.

In an alternate embodiment, the security index $S_{i,1}$ computed for the first contingency analysis path 603-1 is associated with each of the state transitions in the first contingency analysis path 603-1. The security index $S_{i,k}$ computed for the $k^{th}$ contingency analysis path 603-k is associated with each of the state transitions in the $k^{th}$ contingency analysis path 603-k. The security index $S_{i,N}$ computed for the $N^{th}$ contingency analysis path 603-N is associated with each of the transition states in the $N^{th}$ contingency analysis path 603-N.

Referring back to FIG. 3, at step 306 a security index is determined for the received state estimation data based on the extracted feature vector using the trained machine learning model.

The term "machine learning model" as used herein refers to a prediction model given a set of training dataset. In general, each individual sample of the training data is a pair containing a dataset (e.g., contingency analysis information computed from previously obtained state estimation and contingency analysis data and corresponding security index computed for each state or state transitions therein) and a desired output value or dataset (e.g., security index for state estimation data in real-time). The machine learning model analyzes the training data and produces a predictor function. The predictor function, once derived through training, is capable of reasonably predicting or estimating the correct output value or dataset. For example, the trained machine learning model receives the state estimation data and predicts a security index for the given state estimation data in real-time. Machine learning models may include artificial intelligence model such as deep neural network, convolutional neural network, and the like.

In an example, the machine learning model is a regression model. The machine learning model is configured to receive state estimation data and determine security index based on the extracted parameters using the contingency analysis database 112. Notably, the regression model is trained on multiple dataset pairs including contingency analysis information and corresponding security index for a given state stored in the contingency analysis database 112. The machine learning model is trained with contingency analysis information as a regressor and security index for the given state as a target variable.

In an embodiment, the security index is determined for the received estimation data based on the extracted feature vector using the trained machine learning model. The extracted feature vector is inputted at an input node of the trained machine learning model. The feature vector is a regressor variable for the machine learning model. Subsequently, the predicted security index is outputted at an output node of the trained machine learning model. The security index is the target variable for the machine learning model.

The security index is computed as the predicted security index $\hat{S}$ for a real-time system state using the trained machine learning model. In an embodiment, the machine learning model is trained based on the contingency analysis information including a plurality of pairs of states of the power system 102 and corresponding security indices. In an example, the contingency analysis database 112 includes an archival dataset consisting of 'm' system states and their corresponding security indices. The states of the dataset correspond to the many cascaded states of all historical N–1 contingency analyses. The method for computing security indices of each of these states have been computed as explained in FIG. 7. Thus, the regression dataset $D_A$ includes of m {state, security index} pairs that are used to train the regression model $\psi$ as shown below:

$$D_A = \{((S_1, X_1), (S_2, X_2), \ldots, (S_m, X_m))\}$$

$$S = \Psi(X) + \varepsilon$$

where, $X_i$ represents the parameterized feature vector for the $i^{th}$ state, and $S_i$ represents the target variable (security index) for the $i^{th}$ state. Once trained, the machine learning model ψ is capable of computing the predicted real-time security risk of failures (for example, blackouts) of the power system 102 Ŝ for each new real-time state X captured via state estimation as shown:

$$\hat{S}=\Psi(X).$$

The machine learning model is configured to receive the state estimation data, extract feature vectors using a 'featurizer' to create a feature vector X as regressor variable and the security index S as a target variable.

In another embodiment, the machine learning model is trained based on the contingency analysis information including a plurality of pairs of state transitions of the power system 102 and corresponding security indices. In an example, the contingency analysis database 112 includes an archival dataset consisting of 'n' transition states and their corresponding security indices. The states of the dataset correspond to the many cascaded states of all historical N−1 contingency analyses. Instead of using individual feature vectors X representing the states, short-term system state transitions are used as a composite feature vector as input for training the machine learning model. Each contingency cascading path is denoted by a feature vector Y. In an example, the contingency analysis database 112 includes an archival dataset including 'n' cascaded contingency analysis paths, each consisting of a sequence of system states X and represented by a composite feature Y. For each feature Y, the security indices S are also known and available from the contingency analysis database 112. Therefore, the regression dataset $D_B$ is represented by n {state transition, security index} pairs. The dataset $D_B$ is used to train the regression model φ as shown below:

$$D_B=\{((S_1,Y_1),(S_2,Y_2),\ldots,(S_m,Y_m))\}$$

$$S=\varphi(Y)+\varepsilon$$

The machine learning model is configured to receive the state estimation data, extract feature vectors using a 'featurizer' to create a feature vector Y as regressor variable and the security index S as a target variable.

At step 308, a failure of the power system 102 is predicted based on the determined security index. The security index indicates a probabilitic value of security of the power system 102. Hence, a risk of failure of the power system 102 estimated based on the determined security index. The failure of the power system 102 may be partial or full-scale outages of the power system 102. The failure of the power systems 102 may lead to blackout events due to breakdown of components. In an embodiment, the method further includes determining a severity of the predicted failure based on the determined security index. The security index S may be a value calculated between 0 and 1. The severity of failure depends on the value of the security index. An index of 0 indicates total system failure or blackout, and an index of 1 indicates no loss of served utility load, and hence deemed fully secure to outages and failures.

Figure 4:
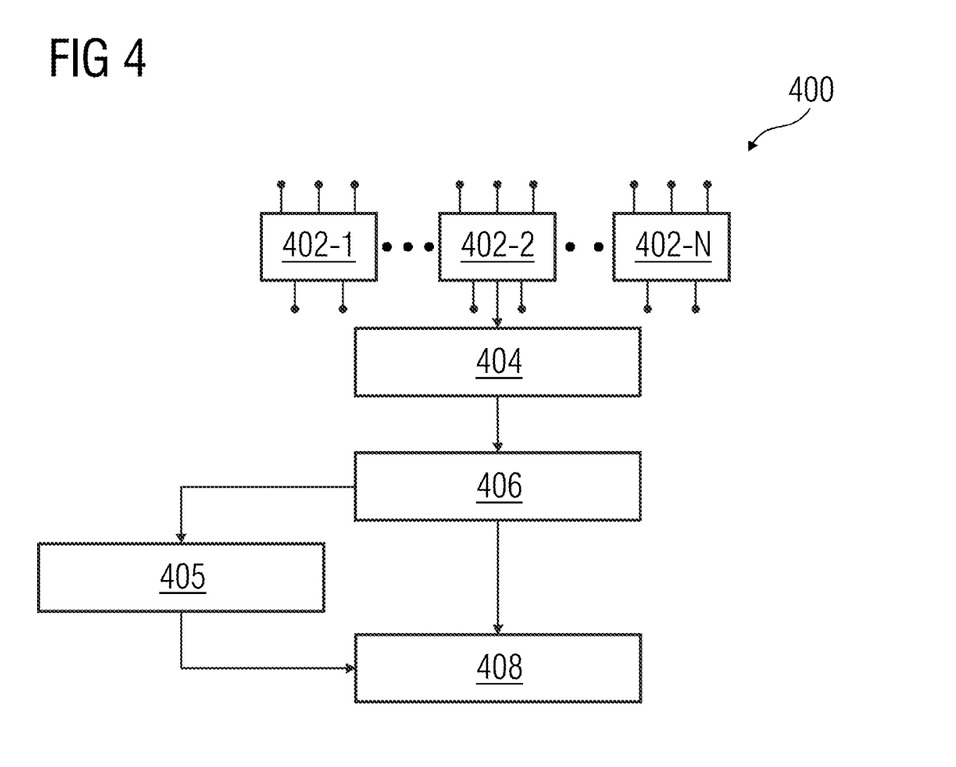
FIG. 4 depicts a high-level architecture diagram of determining contingency analysis information, in accordance with an embodiment.

FIG. 4 depicts a high-level architecture diagram 400 for determining contingency analysis information, in accordance with an embodiment. As shown, field units 402-1 to 402-N are configured to obtain real-time measurements of electrical quantities from different electrical components of the power system 102. In an example, the field units 402-1 to 402-N may include real-time units (RTUs), intelligent electronic devices (IEDs) and phasor measurement units (PMUs). The electrical measurements obtained from by the field units 402-1 to 402-N are provided to a data acquisition system 404 such as SCADA based data acquisition systems that continuously monitor the power system 102. The data acquisition system 404 provides the electrical measurements to a state estimator 406 that runs a state estimation algorithm on SCADA data that has redundancy. The state estimation algorithm computes the best estimates of system states (complex system voltage solution including branch flows and bus injections). The state estimator 406 also includes topology processing, state estimation and parameter adaptation to generate base case results stored in a base case database 405. The real-time estimated states are used to perform a sequence of secondary real-time functions.

Further, the state estimation data from computed by the state estimator 406 is provided to at least one analyzer 408 that performs contingency analysis on real-time state estimation data from state estimator 406 and base case results from the base case database 405. The real-time estimated states are used to perform a sequence of secondary real-time functions. These include what is known as a N−1 contingency analysis. The N−1 contingency analysis computes the results or system impacts of all possible 1 equipment outages that might result in N−1 in-service equipment in a system of N equipment. Each contingency calculates the list of system security constraint violations for the contingency case. When the contingency calculation is allowed to cascade, the cascaded eventuality or end result of the contingency may be assessed.

Therefore, it is possible to identify if a contingency eventually causes no loss of served load, partial loss of served load, or complete power system failure or blackout. In an example, when contingency analysis is performed on power system 102, one or more contingencies is analyzed to determine how such contingencies may impact the power system 102. Such contingencies may include an increasing demand, failure of one or more transmission elements, failure of one or more generators in electric power generation system, changing ambient temperatures, electrical tripping of a breaker, combinations of failures, etc. The contingency analysis results may include one or more contingent performance violations. As used herein, a contingent performance violation is an undesirable result associated with one of transmission elements. Contingent performance violations may include failure of at least one transmission element, overloading of at least one transmission element, overheating of at least one transmission element, etc.

Figure 5:
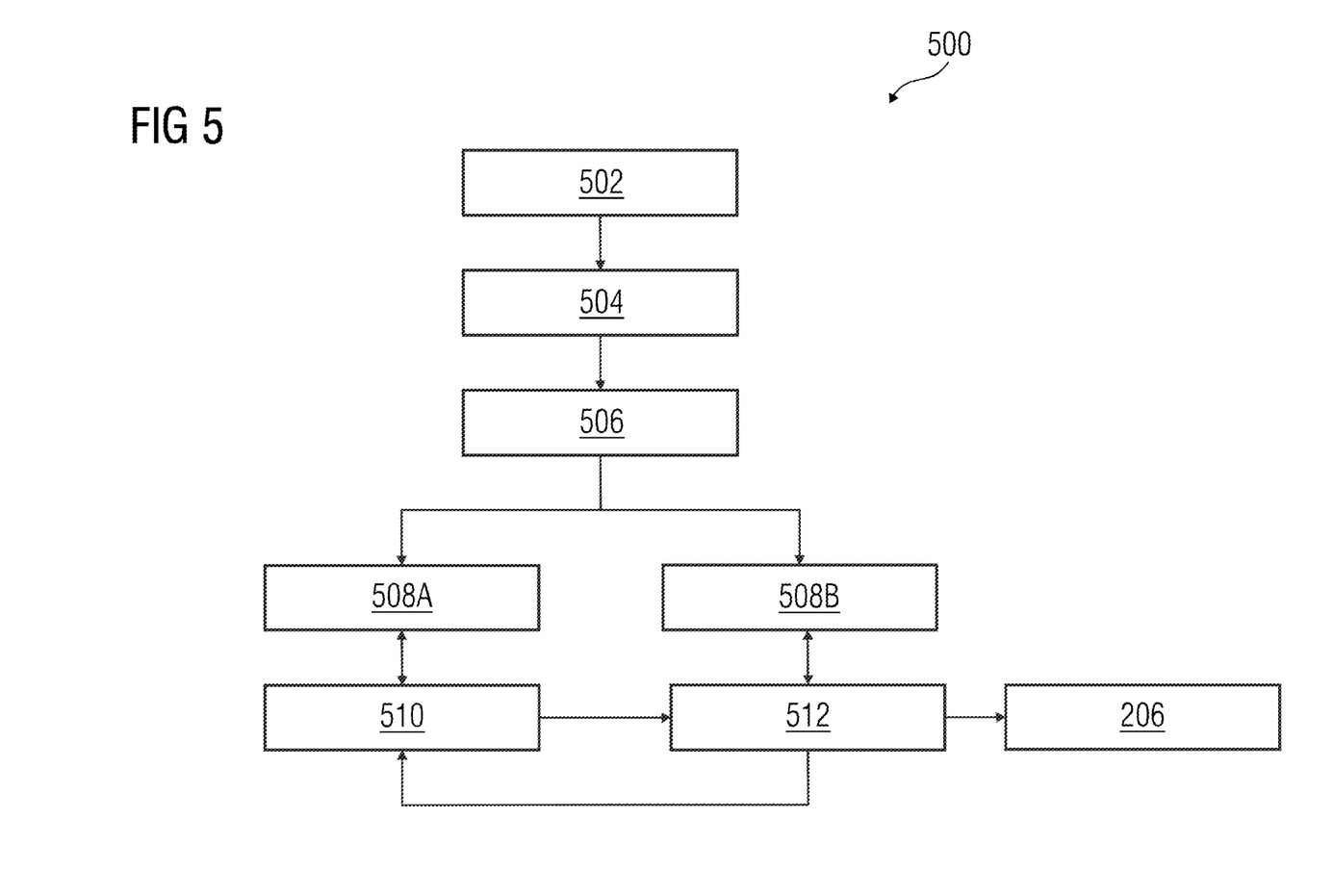
FIG. 5 depicts a high-level architecture of training of the machine learning model to predict failures in the power system, in accordance with an embodiment.

FIG. 5 depicts a high-level architecture of training of the machine learning model 500 to predict failures in the power system 102, in accordance with an embodiment. At step 502, contingency analysis information is obtained from at least one state analyzer 408. In an embodiment, the contingency analysis information may include cascaded data exports in CIM format in the contingency analysis database 112. At step 504, the contingency analysis information is pre-processed to identify features in the contingency analysis information. At set 506, feature vectors are extracted from the pre-processed data. At step 508A and 508B, the data is divided into a first data portion and a second data portion respectively. The collected data may be divided with the first data portion being approximately 70% of the collected data and the second data portion being approximately remaining 30% of the collected data. The first data portion is training dataset and the second data portion is validation dataset. At step 510, the machine learning model is trained on the training dataset. At step 512, the machine learning model is evaluated on the validation dataset. In one or more embodiments, the machine learning model is trained using linear regression of the data in the first data portion or the training dataset. The training dataset includes security index corresponding to contingency analysis information of each of the states of the power system 102. The machine learning model is iteratively trained until a predetermined level of accuracy is attained. The trained machine learning model is then stored in the memory unit 206.

Figure 7:
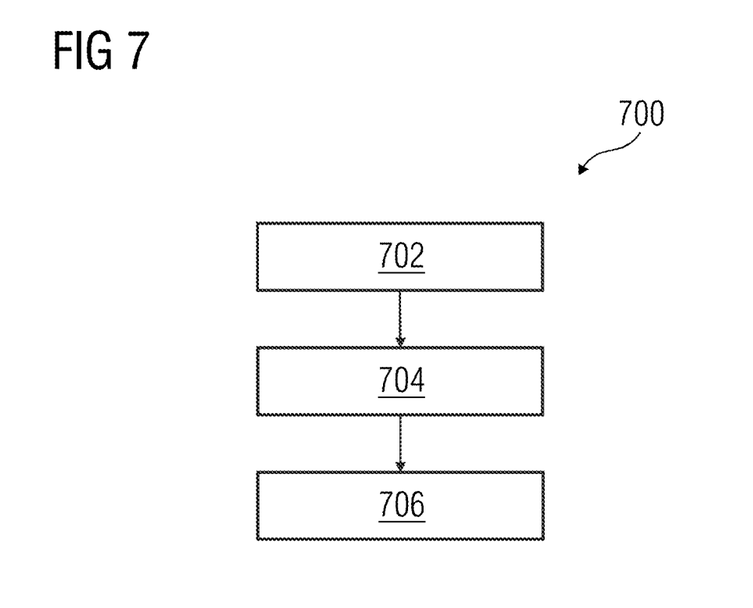
FIG. 7 depicts a flowchart depicting steps of a method for computing the security index for each contingency analysis path pertaining to the real-time state of the power system, in accordance with an embodiment.

FIG. 7 depicts a flowchart 700 of steps of a method for computing the security index for each contingency analysis path pertaining to the real-time state of the power system 102, in accordance with an embodiment. At step 702, a total load served at final cascaded state of the given contingency analysis path pertaining to the real-time state of the power system 102 is determined. At step 704, a total load forecasted is determined at the real-time state of the power system 102. At step 706, the security index is computed based on the determined total load served and the determined total load forecasted.

In an example, for each contingency k at a real-time state i (as shown in FIG. 6B), a security index $S_{k,i}$ is defined and applied as:

$$S_{k,i} = \frac{P_{k,i}^{\infty}}{P_i^f}$$

where, $P_{k,i}^{\infty}$ is the total served MW load at the final/ultimate cascaded state of contingency k for state i, and $P_i^f$ is the total forecast MW load for state i.

Each of the cascaded states in a single contingency analysis path 603 includes a common security index. As aforementioned, states are classified into two types: real-time and cascaded. After a security index is calculated for a contingency k at real-time state i, the same security index is applied to all cascaded states $C_k$ belonging to the $k^{th}$ contingency calculation at real-time state i. This implies that all child cascaded states within a contingency calculation have the same index through its eventual or final security implications being the same. Such a relationship may be represented mathematically as below:

$$[S_{k,i}]_{1 \in c_k} = [S_{k,i}]_{b \in c_k}$$

$$C_k = \{C_{k1}, C_{k2}, \ldots, C_{kj}\}$$

This approach to applying the final or ultimate cascaded states index to all cascaded states is advantageous to predicting the risk of eventual or impending system-wide failures. Notably, the security index S will be between 0 and 1. A index of 0 indicates total system failure or blackout, and an index of 1 indicates no loss of served utility load.

Embodiments provides a real-time indicator of system security that is an index of immediate or impending risk of system-wide catastrophic failures trending to blackout. Advantageously, the embodiments provide an improved system over existing security assessments and has the potential to predict serious risk of security concerns. Embodiments provide a system and a method to identify serious potential failures in the power system in a timely manner such that preventive and/or mitigative measures may be performed to avert large-scale power system failures. Furthermore, embodiments improve efficiency of the power system 102 by real-time detection of failures. Embodiments also aid in resource management and cost effectiveness of the power system 102.

Embodiments may take the form of a computer program product including program modules accessible from computer-usable or computer-readable medium storing program code for use by or in connection with one or more computers, processors, or instruction execution system. For the purpose of this description, a computer-usable or computer-readable medium is any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for predicting failure in a power system in real-time, the method comprising:
    obtaining, by a processing unit, state estimation data corresponding to electrical quantities of the power system received from one or more sources in real-time;
    obtaining contingency analysis information for a plurality of states of the power system from at least one analyzer over a period of time, wherein the contingency analysis information comprises a plurality of contingency analysis paths pertaining to failure status of each component of the power system, and wherein each contingency analysis path comprises cascaded state contingency information for each cascaded state;
    extracting a feature vector from the received state estimation data based on the contingency analysis information using a trained machine learning model, wherein the feature vector corresponds to one or more parameters pertaining to the power system in real-time;
    determining a security index for the received state estimation data based on the extracted feature vector using the trained machine learning model; and
    predicting a failure of the power system based on the determined security index.

2. The method of claim 1, further comprising:
    determining a severity index of the predicted failure based on the determined security index, wherein the severity index ranges from no loss of served utility load to a total blackout.

3. The method of claim 1, further comprising:
determining auxiliary information pertaining to contingency analysis information for each cascaded state of the power system, wherein the auxiliary information comprises static system and equipment data model information, steady-state hypothesis, topology, and state variable information for each state of the power system.

4. The method of claim 3 further comprising:
storing the obtained contingency analysis information for each state of the power system and corresponding auxiliary information in a contingency analysis database.

5. The method of claim 1, further comprising:
computing the security index for each contingency analysis path pertaining to a state of the power system, wherein each of a cascaded state in a contingency analysis path will have a common security index.

6. The method of claim 5, wherein computing the security index for each contingency analysis path pertaining to a real-time state of the power system comprises:
determining total load served at final cascaded state of the given contingency analysis path pertaining to the real-time state of the power system;
determining total load forecasted at the real-time state of the power system; and
computing the security index based on the determined total load served and the determined total load forecasted.

7. The method of claim 4, further comprising:
training the machine learning model based on the contingency analysis database comprising a plurality of pairs of state of the power system and corresponding security indices.

8. The method of claim 4, further comprising:
training the machine learning model based on the contingency analysis database comprising a plurality of pairs of state transitions of the power system and corresponding security indices.

9. The method of claim 1, wherein extracting a feature vector from the received state estimation data of the power system comprises:
determining one or more parameters pertaining to the power system from the received state estimation data using the machine learning model; and
generating the feature vector comprising the determined one or more parameters.

10. The method of claim 1, wherein determining the security index for the received estimation data based on the extracted feature vector using the trained machine learning model comprises:
inputting the extracted feature vector at an input node of the trained machine learning model, wherein the feature vector is a regressor variable for the machine learning model; and
outputting the predicted security index at an output node of the trained machine learning model, wherein the security index is a target variable for the machine learning model.

11. The method of claim 1, further comprising:
outputting the failure of the power system on a graphical user interface associated with a user device.

12. The method of claim 1, wherein the state estimation data comprises at least one of: a current state of the power system and current event information of the power system, regarding at least one of equipment outages, equipment faults, current power system equipment overloads, isolated networks affected, and bulk power systems affected.

13. The method of claim 1, wherein contingency analysis information comprises at least one of: equipment information, transmission equipment information, distribution equipment information, isolated network information, and overhead system information and power system outage information.

14. A system for predicting failure in a power system in real-time, comprising:
one or more sources capable of providing state estimation data associated with real-time condition of one or more power systems; and
a contingency analysis database comprising contingency analysis information of the one or more power systems and corresponding security indices; and
a server communicatively coupled to the one or more sources, wherein the server includes a failure prediction module is configured to:
obtain the state estimation data corresponding to electrical quantities of the power system received from the one or more sources in real-time;
obtain contingency analysis information for a plurality of states of the power system from at least one analyzer over a period of time, wherein the contingency analysis information comprises a plurality of contingency analysis paths pertaining to failure status of each component of the power system, and wherein each contingency analysis path comprises cascaded state contingency information for each cascaded state;
extract a feature vector from the received state estimation data based on contingency analysis information using a trained machine learning model, wherein the feature vector corresponds to one or more parameters pertaining to the power system in real-time;
determine a security index for the received state estimation data based on the extracted feature vector using the trained machine learning model; and
predict a failure of the power system based on the determined security index.

15. The system of claim 14, wherein the failure prediction module is further configured to determine a severity index of the predicted failure based on the determined security index, wherein the severity index ranges from no loss of served utility load to a total blackout.

16. The system of claim 14, wherein the failure prediction module is further configured to:
determine auxiliary information pertaining to contingency analysis information for each cascaded state of the power system, wherein the auxiliary information comprises static system and equipment data model information, steady-state hypothesis, topology, and state variable information for each state of the power system.

17. The system of claim 16, wherein the failure prediction module is further configured to store the obtained contingency analysis information for each state of the power system and corresponding auxiliary information in the contingency analysis database.

18. The system of claim 14, wherein the failure prediction module is further configured to computing the security index for each contingency analysis path pertaining to a state of the power system, wherein each of a cascaded state in a contingency analysis path will have a common security index.

19. The system of claim 17, wherein the server is configured to train the machine learning model based on the contingency analysis database comprising a plurality of pairs of state of the power system and corresponding security indices.

20. A non-transitory computer implemented storage medium that stores machine-readable instructions executable by at least one processor, the machine-readable instructions comprising:
  obtaining state estimation data corresponding to electrical quantities of a power system received from one or more sources in real-time;
  obtain contingency analysis information for a plurality of states of the power system from at least one analyzer over a period of time, wherein the contingency analysis information comprises a plurality of contingency analysis paths pertaining to failure status of each component of the power system, and wherein each contingency analysis path comprises cascaded state contingency information for each cascaded state;
  extracting a feature vector from the received state estimation data based on contingency analysis information using a trained machine learning model, wherein the feature vector corresponds to one or more parameters pertaining to the power system in real-time;
  determining a security index for the received state estimation data based on the extracted feature vector using the trained machine learning model; and
  predicting a failure of the power system based on the determined security index.

* * * * *